United States Patent [19]

Young et al.

[11] Patent Number: 5,029,194
[45] Date of Patent: Jul. 2, 1991

[54] METHOD AND APPARATUS FOR ACCURATELY MEASURING THE DISTANCE TO A SURFACE

[75] Inventors: James E. Young; Ali Regimand, both of Raleigh, N.C.

[73] Assignee: Troxler Electronic Laboratories, Inc., Research Triangle Park, N.C.

[21] Appl. No.: 475,135

[22] Filed: Feb. 5, 1990

[51] Int. Cl.⁵ .............................................. G01B 15/02
[52] U.S. Cl. ...................................... 378/89; 378/86; 250/308; 33/702
[58] Field of Search ..................... 33/702; 378/86, 88, 378/89, 90; 250/253, 308

[56] References Cited

U.S. PATENT DOCUMENTS

| | | |
|---|---|---|
| 3,341,706 | 9/1967 | Swift et al. ........................... 250/253 |
| 3,354,310 | 11/1967 | Swift ................................... 250/253 |
| 3,426,206 | 2/1969 | Lehman et al. . | |
| 4,208,581 | 6/1980 | Kaneko . | |
| 4,254,478 | 3/1981 | Dumas . | |
| 4,541,732 | 9/1985 | Shah . | |
| 4,581,726 | 4/1986 | Makino et al. . | |
| 4,979,197 | 12/1990 | Troxler, Sr. et al. ................. 378/86 |

Primary Examiner—Carolyn E. Fields
Assistant Examiner—David P. Porta
Attorney, Agent, or Firm—Bell, Seltzer, Park & Gibson

[57] ABSTRACT

Measuring the distance to a surface of an object using ultrasonic energy pulses, an ultrasonic energy pulse is directed toward the object and the time is measured for the reflection to return so as to determine the distance to the object. A reference ultrasonic pulse is directed through a fixed and known distance to provide a reference measurement. To enhance the accuracy of the measurement, the air in the region traversed by the ultrasonic pulses is mixed by directing a swirling flow of air in this region so that the temperature of the air in the path of the reference measurement is more nearly representative of the temperature of the air where the distance measurement is taken.

21 Claims, 2 Drawing Sheets

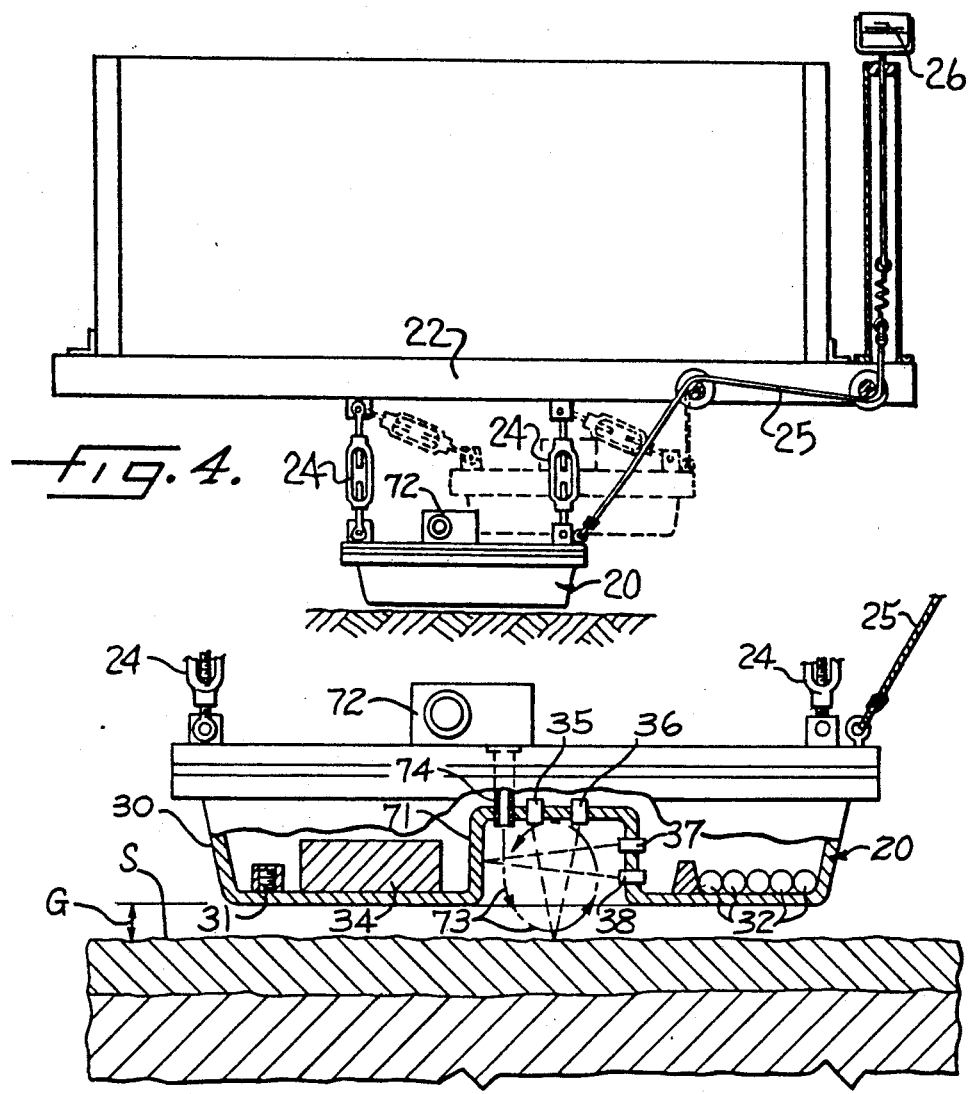
fig. 4.
fig. 5.
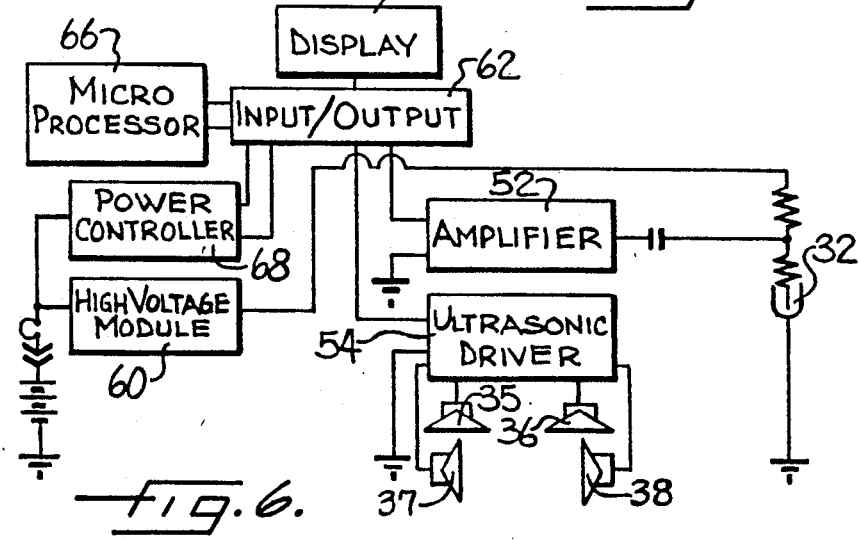
fig. 6.

METHOD AND APPARATUS FOR ACCURATELY MEASURING THE DISTANCE TO A SURFACE

FIELD OF THE INVENTION

The present invention relates to an apparatus and method for accurately measuring the distance to a surface and more particularly for accurately measuring a distance through an ambient fluid to a surface.

BACKGROUND OF THE INVENTION

Ultrasonic measurement devices for determining the distance to an object are well known, as described for example in Dumas U.S. Pat. No. 4,254,478 and Makino et al. U.S. Pat. No. 4,581,726. Such devices transmit an ultrasonic wave through a fluid medium such as air or water and receive its reflection back from the object. Based on the speed of the ultrasonic wave through the fluid medium the device may determine the distance to the object very accurately. Such ultrasonic distance measuring devices have a great many applications, including navigation, depth sensors, liquid level sensors and other uses.

However, ultrasonic distance measuring devices are quite sensitive to temperature change in the fluid medium because of the effect that temperature has on the speed of sound through the fluid. Accordingly, many devices have means for correcting the temperature of the fluid. Some devices have been developed which measure the temperature using an ultrasonic transmission through a known distance, such as Shah U.S. Pat. No. 4,541,732. Accordingly, one known means of compensating for the variation in the propagation of ultrasonic waves is by transmitting and receiving an ultrasonic wave travelling through a fixed and known distance. This technique has been employed in commonly owned U.S. Application Ser. No. 07/312,128 filed Feb. 17, 1989, now U.S. Pat. No. 497,197, which is continuation of U.S. Patent Application Ser. No. 06/868,776 filed May 22, 1986, now abandoned. In the commonly owned device the distance measured is between a nuclear density gauge and the surface of a material being compacted. In the device, the distance between the nuclear gauge and the surface is of critical importance, significantly affecting the measurement of the density of the material. However, while measuring the density of hot asphalt, the air above the asphalt may become stratified into layers of varying temperature air. Therefore the distance measuring ultrasonic pulse is traveling through air of a different temperature than the air that the reference measuring ultrasonic pulse travels through. This can cause errors in the distance measurement that would adversely affect the accuracy of the density measurement.

Accordingly, it is an object of the present invention to provide a method and apparatus for accurately measuring the distance and which overcomes the above noted disadvantages and limitations of the prior art.

It is a more particular object of the present invention to provide a method and apparatus for accurately measuring the distance to an object which compensates for homogeneous and nonhomogeneous variations in ambient fluid temperature.

SUMMARY OF THE INVENTION

The above and other objects of the present invention are achieved by a method and apparatus which comprises distance measurement means carried by the apparatus and oriented toward a surface for measuring the time required for an energy pulse to be transmitted to and reflected back from the surface. To compensate for changes in the speed of travel of the energy pulse, reference measurement means are carried by the test apparatus and mounted for measuring the time required for an energy pulse to be transmitted a fixed distance so as to thereby provide a reference measurement. The apparatus further comprises means for mixing the ambient fluid in a zone between the surface and the reference measurement means so that the temperature of the fluid in the path of the said reference measurement means is more nearly representative of the temperature adjacent the surface.

In accordance with process aspects of the invention, a method is provided for measuring the distance through an ambient fluid to a surface. The method comprises measuring the time required for an energy pulse to travel between a test instrument and the surface to obtain a distance measurement between the test instrument and the surface and measuring the time required for an energy pulse to be transmitted a fixed distance to compensate for changes in the speed of travel of the energy pulse. The method further comprises mixing the ambient fluid in a zone between the surface and the reference measurement means so that the temperature of the fluid in the path of the reference measurement means is more nearly representative of the temperature adjacent the surface.

The method and apparatus are particularly useful in an environment where the ambient fluid tends to become stratified in temperature. For example the invention can be used in combination with a non-contact nuclear density gauge measuring the density of hot asphalt which inherently includes hotter air adjacent the asphalt surface and progressively cooler air approaching ambient conditions at distances further from the surface. The mixing of ambient fluid may be accomplished in a recessed chamber of the nuclear density device so that the ambient fluid swirls in the chamber to form a homogeneous mixture.

BRIEF DESCRIPTION OF THE DRAWINGS

Some of the features and advantages have been stated and others will become apparent from the detailed description which follows and from the accompanying drawings, in which

FIG. 4 is a vertical sectional view through the compactor vehicle taken substantially along the line 4-4 of FIG. 1 and showing the arrangements for mounting the detector unit in suspended relation a short distance above the paving surface and for retracting the detector unit during non-use;

FIG. 5 is an enlarged view of the detector unit of FIG. 4, with portions of the housing thereof broken away to show the interior components and particularly to show the distance measuring arrangement of the present invention; and FIG. 6 is a schematic diagram of the electronic components of the instrument.

DETAILED DESCRIPTION OF THE PREFERRED EMBODIMENT

Referring more particularly to the drawings, FIG. 5 illustrates a preferred embodiment of the invention formed as a component of a nuclear density test apparatus 20. In this arrangement the invention measures the "air gap" G between the nuclear density measurement unit 20 and the ground surface S. The air gap G has a substantial affect on the accuracy of the density measurement as will be explained. However, a brief discussion of the nuclear density measurement apparatus 20 will provide a better understanding of the invention.

Figure 1:
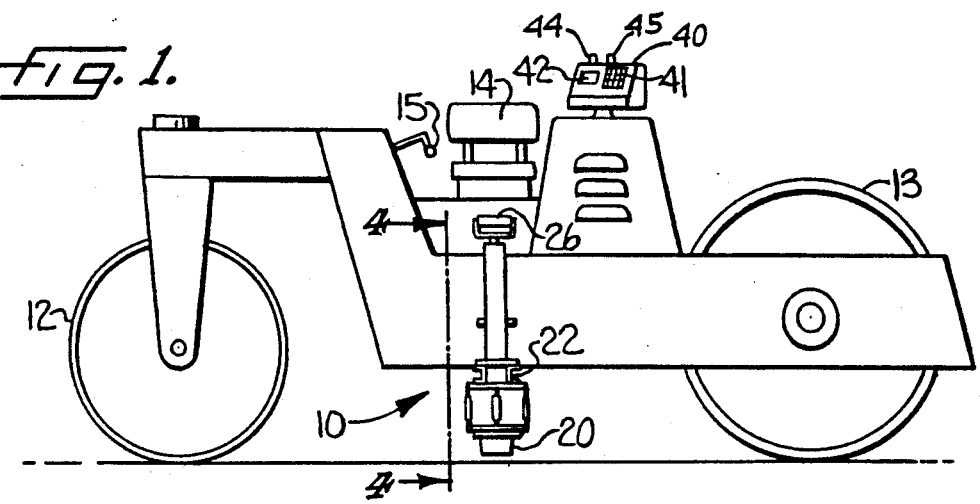
FIG. 1 is a side elevational view of a compactor vehicle upon which is mounted a nuclear density gauge in accordance with the preferred embodiment of the present invention.
Figure 2:
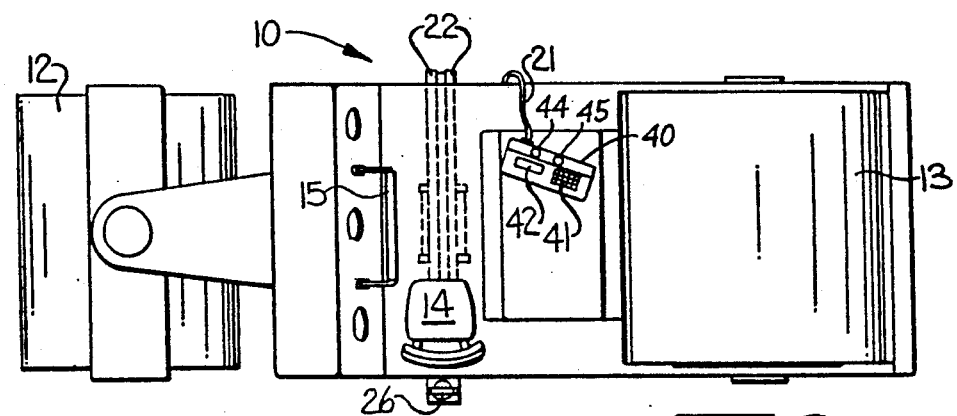
FIG. 2 is a top elevational view thereof.

Referring to FIG. 1, the reference character 10 generally indicates a compactor vehicle of the type which is conventionally used for rolling and compacting soils, paving materials and the like. The compactor vehicle includes a chassis 11 and large diameter smooth surfaced rollers 12, 13, mounted to the chassis 11 and serving as the wheels of the compactor vehicle. As illustrated, a driver's seat 14 is located in the central portion of the vehicle chassis, and suitable controls 15 are provided to enable the driver to control the direction and speed of the vehicle. As is conventional, suitable motor means (not shown) is provided for propelling the vehicle along the pavement.

A nuclear density measurement apparatus comprises two units, a density measurement unit 20 mounted beneath the compactor vehicle and located close to the surface of the pavement, and a console unit 40 accessible to the driver's seat 14 at the top of the vehicle. The density measurement unit 20 and the console unit 40 are interconnected by a cable 21. The console unit 40 includes a keyboard 41 by which the operator may control the operation of the gauge and a display 42 by which the density reading obtained by the gauge as well as other information, is communicated to the operator. The mounting of the components of the measurement apparatus in this manner makes it possible to measure the pavement density during the operation of the compactor vehicle, and to rapidly provide the operator of the vehicle with a readout of pavement density. This makes it possible for the vehicle operator to immediately know when he has completed a sufficient number of rolling passes to achieve a desired degree of compaction.

Figure 3:
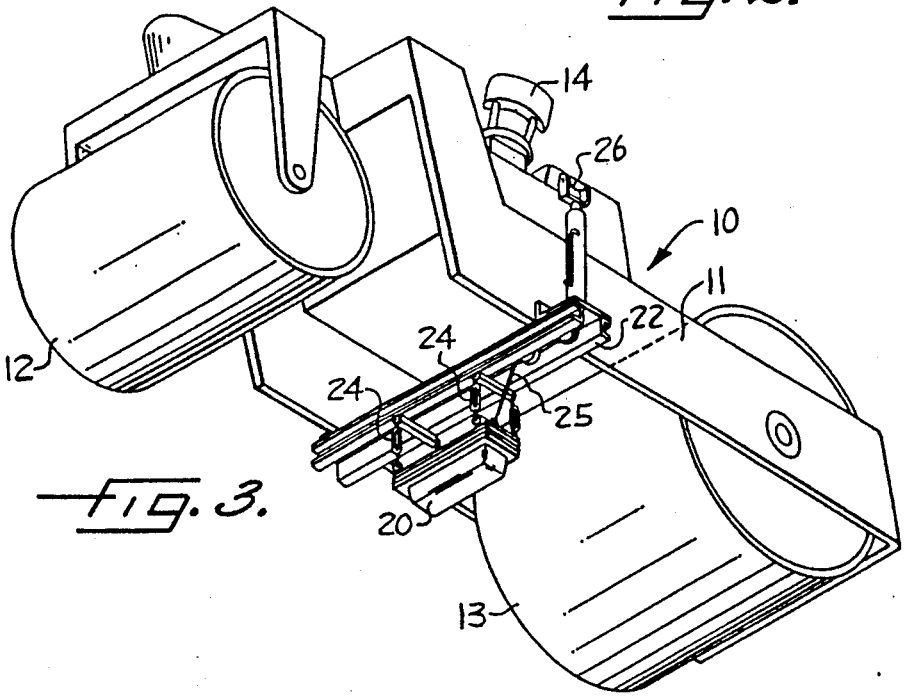
FIG. 3 is a perspective view thereof from the underside.

As best seen in FIG. 3, means is provided on the underside of the compactor vehicle for mounting the density measurement unit 20 in suspended relation a short distance above the pavement surface. In the particular embodiment illustrated, the mounting means includes an elongate beam 22 mounted to the chassis 11 of the compactor vehicle and extending transversely thereacross. The measurement unit is suspended from the beam 22 by three adjustable mounting brackets 24. Brackets 24 are pivotally mounted to the beam to provide freedom of movement of the measurement unit in all directions. Thus in the event that the measurement unit strikes an obstruction protruding above the pavement surface, it can freely swing out of the way and then return to its normal suspended operative position.

As best seen in FIG. 5, the measurement unit 20 comprises a housing 30 having a relatively smooth planar undersurface which is oriented generally parallel and in spaced relation to the pavement surface S. The housing 30 encloses a suitable radiation source 31 and a detector means 32. The source 31 is located adjacent to one end of the housing for directing gamma radiation down to the surface S. The detector means 32 is mounted adjacent to the opposite end of the housing for detecting gamma radiation that is backscattered from the underlying pavement. The amount of gamma radiation counted per unit time is a function of the density of the underlying pavement and the air gap distance G between the pavement surface S and the detector means 32. Accordingly, the air gap G must be precisely determined to insure an accurate density measurement. The unit 20 is further provided with shielding 34 around the source 31 and around the detector means 32, as is conventional, to prevent radiation from reaching the detector means in a direct path from the source. Additionally, means (not shown) is provided for completely shielding the radiation source when the gauge is not being used for measurement.

Referring now to FIG. 6, the detector 32 is electrically connected with a corresponding amplifier 52. Additionally, as is required, the detector is connected with a source 60 of high voltage. Output from the amplifier 52 is directed to an input/output circuit generally indicated at 62 and is available through such circuitry to an electronic computing device shown in the form of a microprocessor 66 and to a display 42. Power to the entire device is provided by a power controller 68.

Referring now to FIG. 5, the test apparatus generally referred to by the numeral 70 forms the preferred embodiment of the present invention. The test apparatus 70 comprises a housing 30 which is the same housing for the density measurement unit 20. The housing 30 has a recessed chamber 71 located on the underside of the housing 30 generally facing the ground surface S. Within the recessed chamber 71 mounted along a generally horizontal surface is an ultrasonic distance measuring transmitter 35 for directing an ultrasonic energy pulse down to the ground surface S. A cooperating ultrasonic receiver 36 is mounted adjacent the transmitter 35 in the recessed chamber 71 along the horizontal surface and oriented generally downwardly to receive the ultrasonic energy pulse reflected from the ground surface S. As is conventionally knoWn, the distance travelled by the ultrasonic energy pulse from the transmitter 35 to the ground surface s and back to the receiver 36 is determined by the time elapsed multiplied by the speed of the pulse. An ultrasonic driver 54 (FIG. 6) is provided to control and monitor the transmitter and receiver 35, 36 and mark the time elapsed during the travel of the pulse. The microprocessor 66 (FIG. 6) is connected to the ultrasonic driver 54 through input/output device 62 (FIG. 6) to store the elapsed time for later computations.

The ultrasonic pulse travels through the air at the speed of sound, which is dependent on the temperature of the air. Therefore, changes in the air temperature will cause changes in the speed of sound. To provide a reference for the speed of the pulse through the air, a reference measurement ultrasonic transmitter 37 is provided along a generally vertical wall within the recessed chamber 71 and oriented generally horizontally to direct an ultrasonic energy pulse to an opposed wall within the recessed chamber 71. A cooperating reference measurement ultrasonic receiver 38 is mounted adjacent the transmitter 37 in the recessed chamber 71 for receiving the reflected ultrasonic energy pulse back from the opposite wall. The distance the reference ultrasonic pulse travels is fixed, so that a measurement of the elapsed time for the pulse to travel the fixed distance provides a reference for the speed of the pulse. By using this reference for the elapsed time of the measured pulse from transmitter 35, and dividing this value into the distance measured by transducers 35 and 36, the microprocessor 66 (FIG. 6) can correct for variations in the speed of sound due to temperature variations and more accurately calculate the distance of the air gap G.

However, as can be seen most clearly in the drawings, the reference pulse travels over a path entirely within the recessed chamber 71 while the distance measuring pulse travels partly within the recessed chamber 71 and partly outside the chamber. Should the air temperature outside the recessed chamber be different than the air temperature within the chamber, the reference measurement will not accurately indicate the temperature of the distance measuring ultrasonic pulse. It is likely that the air temperatures would be different, particularly when the density measurement unit 20 is being used with hot asphalt which heats the air layer at the surface of the asphalt and may produce stratified layers of air at different temperatures. Such stratified layers can cause errors in the measured distance due to refraction of the ultrasonic measurement pulse and/or variation in the speed of sound due to temperature difference. This source of error in the distance measurement of the air gap G or in the density measurement had not been previously recognized. In order to overcome this source of inaccuracy, the test apparatus 70 is provided with means for mixing the air in the region of the housing 30 and the underlying air gap. As illustrated, a fan 72 is carried by the housing 30. A duct 74 is connected to the fan and directs a flow of air into the recessed chamber 71. As indicated by the arrows 73 in FIG. 5, the air flow is discharged generally downwardly toWard the underlying surface S and, upon striking the surface, is redirected back up into the recessed chambers, thereby producing a swirling air flow pattern. The swirling air flow mixes the ambient air in the zone between the ultrasonic transmitters and receivers 35, 36, 37, 38 with the ambient air in the air gap zone between the housing and the surface S so that temperature stratifications are eliminated and the temperature of the air in the path of the reference measurement transmitter and receiver 37, 38 is more nearly representative of the air in the path of the height measuring ultrasonic pulse. Accordingly, the temperatures of the air inside and outside the chamber 71 are balanced by thorough mixing. Moreover, by mixing the air within the paths of the ultrasonic measurements, the air becomes substantially homogeneous, thus avoiding refraction and distortion of the ultrasonic pulses and thereby enhancing the overall accuracy of the distance measurement.

In the drawings and specification, there has been set forth a preferred embodiment of the invention. Other embodiments and applications of the invention should be obvious to those skilled in the art and should be considered as within the scope of the invention. Moreover, while specific terms are employed in the disclosure, they are used in a generic and descriptive sense only and not for purposes of limitation.

That which is claimed is:

1. A test apparatus for accurately measuring the distance through an ambient fluid to a surface, comprising:
   distance measurement means carried by the test apparatus and oriented toward the surface for measuring the time required for an energy pulse to be transmitted to and reflected back from the surface;
   reference measurement means carried by the test apparatus and mounted for measuring the time required for an energy pulse to be transmitted a fixed distance so as to thereby provide a reference measurement to compensate for changes in the speed of travel of the energy pulse due to temperature changes; and
   means for mixing the ambient fluid in a zone between the surface and said reference measurement means so that the temperature of the fluid in the path of said reference measurement means is more nearly representative of the temperature adjacent said surface.

2. The apparatus according to claim 1 wherein said distance measurement means and said reference measurement means each comprise pairs of cooperating ultrasonic transmitters and receivers for transmitting and receiving bursts of ultrasonic energy.

3. The apparatus according to claim 1 wherein said means for mixing comprises means for directing a stream of ambient fluid toward the surface thereby mixing the ambient fluid.

4. The apparatus according to claim 3 wherein said means for mixing comprises a fan for creating a stream of ambient fluid and a duct cooperating with said fan for directing the stream toward the surface.

5. The apparatus according to claim 1 further including a housing and a recessed chamber within said housing wherein said measurement means are located in said chamber.

6. The apparatus according to claim 5 wherein said means for mixing the ambient fluid causes the ambient fluid to swirl in said chamber.

7. A test apparatus for accurately measuring the distance through an ambient fluid to a surface, comprising:
   a housing;
   a recessed chamber within said housing;
   distance measurement means located in said chamber and oriented toward the surface for measuring the time required for an ultrasonic energy pulse to be transmitted to and reflected back from the surface;
   reference measurement means located in said chamber and mounted for measuring the time required for an ultrasonic energy pulse to be transmitted through a fixed distance so as to thereby provide a reference measurement to compensate for changes in the speed of travel of the ultrasonic energy pulse due to temperature changes; and
   means for mixing the ambient fluid in a zone between said recessed chamber and the surface so that the temperature of the fluid in the path of said reference measurement means is more nearly representative of the temperature in the path of said distance measurement means.

8. The apparatus according to claim 7 wherein said distance measurement means and said reference measurement means each comprise pairs of cooperating ultrasonic transmitters and receivers for transmitting and receiving bursts of ultrasonic energy.

9. The apparatus according to claim 7 wherein said means for mixing comprises means for directing a stream of ambient fluid toward the surface thereby mixing the ambient fluid.

10. The apparatus according to claim 9 wherein said means for mixing comprises a fan for creating a stream of ambient fluid and a duct cooperating with said fan for directing the stream toward the surface.

11. A nuclear density gauge for measuring the density of a test material, said gauge comprising:
    a housing;

nuclear radiation source carried by said housing for directing radiation toward the test material;

a nuclear radiation detector carried by said housing for receiving and detecting radiation reflected from the test material;

distance measurement means carried by said housing and oriented toward said test material for measuring the time required for an ultrasonic energy pulse to be transmitted to and reflected back from said test material;

reference measurement means carried by said housing and mounted for measuring the time required for an ultrasonic energy pulse to be transmitted a fixed distance so as to thereby provide a reference measurement to compensate for changes in the speed of travel of the ultrasonic energy pulse due to temperature variations;

means for mixing air in a zone between the test material and said reference measurement means so that the temperature of the air in the path of said reference measurement means is more nearly representative of the temperature in the path of said distance measurement means; and means cooperating with said radiation detector, said distance measurement means and said reference measurement means for determining the density of the test material.

12. The nuclear density gauge according to claim 11 wherein said housing includes a recessed chamber and said distance measurement means, said reference measurement means and said mixing means are located in said recessed chamber.

13. The nuclear density gauge according to claim 12 wherein said means for mixing the ambient fluid comprises means for directing a stream of ambient fluid from said chamber toward the test material to cause the ambient fluid to swirl in said chamber.

14. The nuclear density gauge according to claim 11 wherein said distance measurement means and said reference measurement means each comprise pairs of cooperating ultrasonic transmitters and receivers for transmitting and receiving bursts of ultrasonic energy.

15. The nuclear density gauge according to claim 11 wherein said means for mixing comprises means for directing a stream of ambient fluid toward the test material thereby mixing the ambient fluid.

16. The nuclear density gauge according to claim 14 wherein said means for mixing comprises a fan for creating a stream of ambient fluid and a duct cooperating with said fan for directing the stream toward the test material.

17. A nuclear density gauge for measuring the density of a test material, said gauge comprising:

a housing, including a wall, adapted to be positioned in opposed spaced apart relation to the test material to form an air gap between the housing and the surface of the test material;

a recessed chamber in said wall of said housing;

a nuclear radiation source carried by said housing for directing radiation toward the test material;

a nuclear radiation detector carried by said housing for receiving and detecting radiation reflected from the test material;

ultrasonic distance measurement means comprising an ultrasonic transmitter and an ultrasonic receiver carried by said housing in said recessed chamber and oriented toward the test material for measuring the time required for an ultrasonic energy pulse to be transmitted to and reflected back from the test material;

ultrasonic reference measurement means comprising an ultrasonic transmitter and an ultrasonic receiver carried by said housing in said recessed chamber and oriented a fixed distance apart for measuring the time required for an ultrasonic energy pulse to be transmitted across the fixed distance so as to thereby provide a reference measurement to compensate for changes in the speed of travel of the ultrasonic energy pulses due to temperature variations;

blower means cooperating with said housing for directing a flow of air into the recessed chamber so as to cause mixing of the air in a zone beneath the housing with the air present in the recessed chamber so that the temperature of the air in the path of said reference measurement means is more nearly representative of the temperature of the air in the path of said distance measuring means.

18. A method of accurately measuring the distance from a test instrument to a surface, comprising the steps of:

measuring the time required for an energy pulse to travel between the test instrument and the surface to thereby obtain a distance measurement between the test instrument and the surface;

measuring the time required for an energy pulse to travel a fixed distance to thereby obtain a reference measurement to compensate for changes in speed of travel of the energy pulse due to temperature changes; and mixing the ambient air in a zone between the surface and the test instrument and in the path of travel of the energy pulses so that the temperature of the air in the path of the reference measurement is more nearly representative of the temperature of the air where the distance measurement is taken.

19. The method according to claim 18 wherein said step of mixing the ambient air comprises directing a stream of ambient air toward the surface.

20. The method according to claim 18 wherein the distance measurement and the reference measurement are made from a recessed chamber of a housing and said step of mixing the ambient air comprises directing a stream of ambient air toward the surface and causing the ambient air to swirl in the recessed chamber.

21. A method of measuring the density of a test material comprising steps of:

directing radiation through an air gap to the test material;

measuring the radiation which is backscattered through the air gap from the test material;

measuring the time required for an ultrasonic energy pulse to travel between the test instrument and the surface of the test material to obtain a measurement of the air gap;

measuring the time required for an ultrasonic energy pulse to travel a fixed distance to thereby obtain a reference measurement to compensate for changes in the speed of travel of the ultrasonic energy pulse due to temperature changes;

mixing the ambient air in the zone between the surface of the test material and the test instrument and in the path of travel of the ultrasonic energy pulses so that the temperature of the air in the path of the reference measurement is more nearly representative of the temperature of the air where the distance measurement is taken; and determining the density of the material based on the measurement of the air gap and the measurement of the backscattered radiation measured through the air gap.

* * * * *

UNITED STATES PATENT AND TRADEMARK OFFICE
CERTIFICATE OF CORRECTION

PATENT NO. : 5,029,194

DATED : July 2, 1991

INVENTOR(S) : James E. Young, et al.

It is certified that error appears in the above-identified patent and that said Letters Patent is hereby corrected as shown below:

Column 1, line 38, "U.S. Pat. No. 497,197" should be
-- 4,979,197 --.

Column 1, line 39, "06/868,776" should be
-- 06/865,776 --.

Column 4, line 43, "s" should be -- S --.

Column 7, line 1, insert -- a -- before "nuclear".

Signed and Sealed this

Sixteenth Day of March, 1993

Attest:

STEPHEN G. KUNIN

*Attesting Officer*         *Acting Commissioner of Patents and Trademarks*